United States Patent
Suzuki

(10) Patent No.: US 9,865,094 B2
(45) Date of Patent: Jan. 9, 2018

(54) INFORMATION PROCESSING APPARATUS, DISPLAY CONTROL METHOD, AND PROGRAM

(71) Applicant: Sony Corporation, Tokyo (JP)

(72) Inventor: Seiji Suzuki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/377,093

(22) Filed: Dec. 13, 2016

(65) Prior Publication Data

US 2017/0148220 A1    May 25, 2017

Related U.S. Application Data

(63) Continuation of application No. 14/356,008, filed as application No. PCT/JP2012/072202 on Aug. 31, 2012, now Pat. No. 9,569,895.

(30) Foreign Application Priority Data

Nov. 9, 2011    (JP) .................. 2011-245304

(51) Int. Cl.
    *G06T 19/00*    (2011.01)
(52) U.S. Cl.
    CPC ........ *G06T 19/006* (2013.01); *G06T 2210/16* (2013.01)
(58) Field of Classification Search
    None
    See application file for complete search history.

(56) References Cited

U.S. PATENT DOCUMENTS

| 7,663,648 | B1 | 2/2010 | Saldanha et al. |
| 2003/0101105 | A1 | 5/2003 | Vock |
| 2009/0128564 | A1 | 5/2009 | Okuno |
| 2011/0025689 | A1 | 2/2011 | Perez |
| 2011/0069866 | A1 | 3/2011 | Kim et al. |
| 2012/0002841 | A1 | 1/2012 | Aratani et al. |
| 2013/0088489 | A1* | 4/2013 | Schmeitz ............ H04N 5/2254 345/419 |

FOREIGN PATENT DOCUMENTS

| CN | 102156810 | 8/2011 |
| JP | 2000-341721 | 12/2000 |
| JP | 2002-24319 | 1/2002 |
| JP | 2004-246729 | 9/2003 |
| JP | 2004-145448 | 5/2004 |
| JP | 2006-304331 | 11/2006 |

* cited by examiner

*Primary Examiner* — Michelle Chin
(74) *Attorney, Agent, or Firm* — Haug Partners LLP; William S. Frommer

(57) ABSTRACT

There is provided an information processing apparatus including a judgment unit for judging an anteroposterior relationship between a shot actual object and a virtual object for each part by use of depth information, and a display control unit for displaying a virtual image in which the virtual object is projected to be overlapped on a shot image in which the actual object is shot based on the anteroposterior relationship judged by the judgment unit.

8 Claims, 12 Drawing Sheets

INFORMATION PROCESSING APPARATUS, DISPLAY CONTROL METHOD, AND PROGRAM

This is a continuation of application Ser. No. 14/356,008, filed May 2, 2014, which is based on International Application PCT/JP2012/072202, filed Aug. 31, 2012, which claims priority under 35 USC 119 to Japanese Application No. 2011-245304, filed in Japan Nov. 9, 2011, the entirety of which is incorporated herein by reference.

TECHNICAL FIELD

The present disclosure relates to an information processing apparatus, a display control method and a program.

BACKGROUND ART

There are proposed, as virtual try-on systems, various try-on image generation techniques for combining a shot image shooting a user therein with a clothes image.

For example, Patent Literature 1 discloses therein a processing of combining a user body image with a clothes image. Specifically, an image processing server described in Patent Literature 1 changes a size of the clothes image and adjusts an orientation thereof based on body profile data (such as body height and shoulder width) attached on the user body image and the orientation of the body in the image, and combines it on the body image.

CITATION LIST

Patent Literature

Patent Literature 1: JP 2006-304331A

SUMMARY OF INVENTION

Technical Problem

With the try-on image generation technique as described in Patent Literature 1, however, a clothes image is combined on a user body image, and thus the virtual clothes are always drawn in front of the actual object (body). For example, also when a user's hand is in front of the torso, virtual clothes are drawn in front and thus the hand is hidden behind the virtual clothes.

As described above, when an anteroposterior relationship between an actual object and a virtual object is complicated, it was difficult to properly generate a combined image.

Thus, the present disclosure proposes a novel and improved information processing apparatus capable of judging an anteroposterior relationship between an actual object and a virtual object for each part, and a display control method and a program.

Solution to Problem

According to an embodiment of the present disclosure, there is provided an information processing apparatus including a judgment unit for judging an anteroposterior relationship between a shot actual object and a virtual object for each part by use of depth information, and a display control unit for displaying a virtual image in which the virtual object is projected to be overlapped on a shot image in which the actual object is shot based on the anteroposterior relationship judged by the judgment unit.

According to an embodiment of the present disclosure, there is provided a display control method comprising the steps of judging an anteroposterior relationship between a shot actual object and a virtual object for each part by use of depth information, and displaying a virtual image in which the virtual object is projected to be overlapped on a shot image in which the actual object is shot based on the anteroposterior relationship judged in the judgment step.

According to an embodiment of the present disclosure, there is provided a program for causing a computer to perform a processing of judging an anteroposterior relationship between a shot actual object and a virtual object for each part by use of depth information, and a processing of displaying a virtual image in which the virtual object is projected to be overlapped on a shot image in which the actual object is shot based on the anteroposterior relationship judged by the judgment processing.

Advantageous Effects of Invention

As described above, according to the present disclosure, it is possible to judge an anteroposterior relationship between an actual object and a virtual object for each part.

DESCRIPTION OF EMBODIMENTS

Hereinafter, a preferred embodiment of the present disclosure will be described in detail with reference to the appended drawings. Note that, in this specification and the drawings, elements that have substantially the same function and structure are denoted with the same reference signs, and repeated explanation is omitted.

The explanation will be made in the following order.
1. Outline of AR try-on system according to one embodiment of the present disclosure
2. Structure of information processing apparatus
3. Display control
3-1. Basic display control
3-2. Drawing of AR try-on image in anteroposterior relationship
4. Conclusion

1. Outline of AR Try-on System According to One Embodiment of the Present Disclosure In recent years, a technique called augmented reality (AR) for overlapping additional information on the real world and presenting it to a user is paid attention. Information to be presented to the user in the AR technique can be visualized by use of various forms of virtual objects such as text, icon or animation. One main field to which the AR technique is applied is to support user's activities in the real world. In the following, the AR technique is applied to a try-on system.

With the try-on system utilizing the AR technique, a virtual clothes image is displayed to be overlapped in cooperation of user's activities so that virtual try-on can be experienced in real-time. The AR try-on system according to one embodiment of the present disclosure judges an anteroposterior relationship between a subject which is a real object and virtual clothes which are a virtual object, and displays the virtual image to be overlapped based on the judged anteroposterior relationship.

Figure 1:
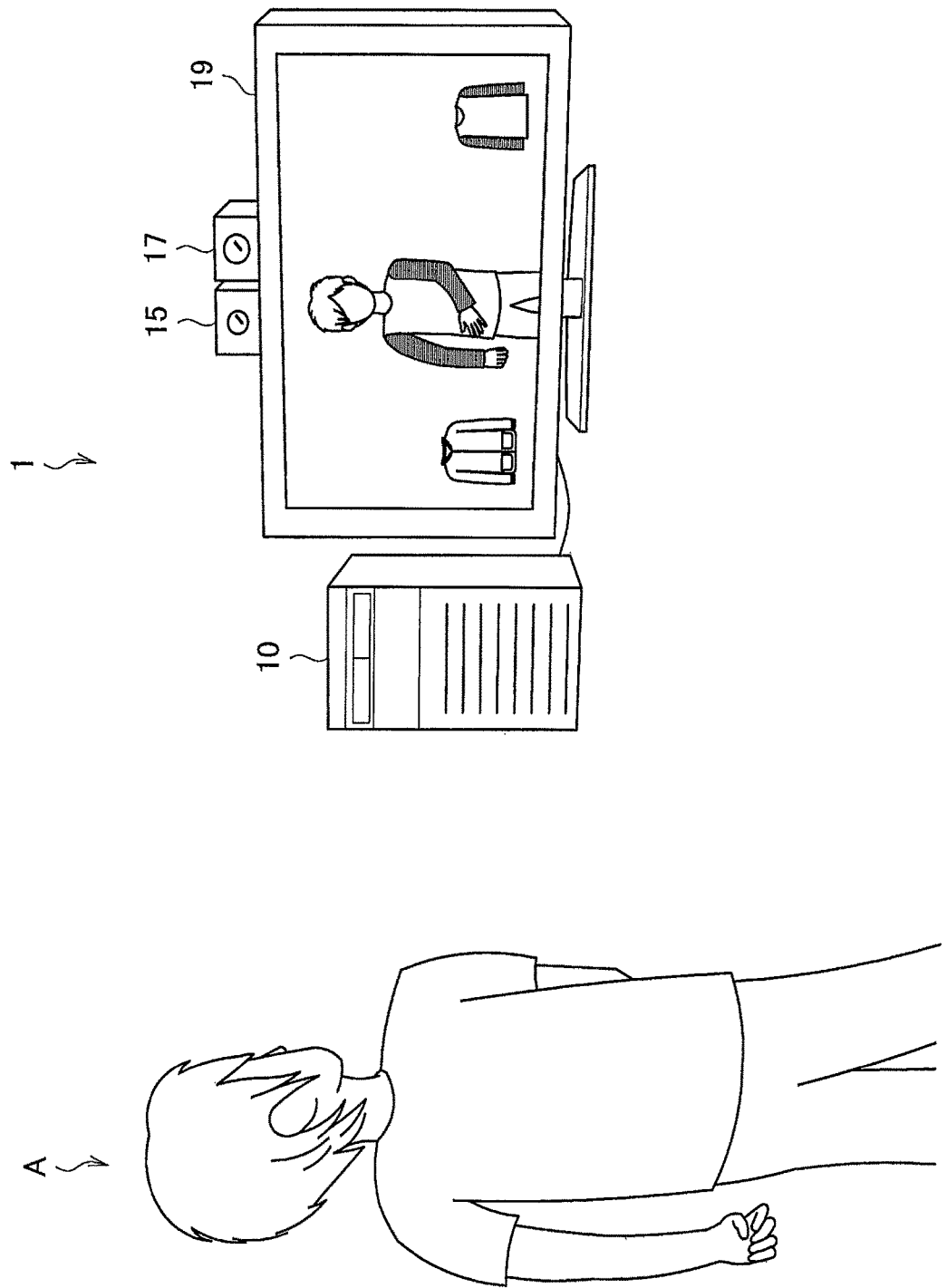
FIG. 1 is a diagram for explaining the outline of an AR try-on system according to one embodiment of the present disclosure.

The outline of the AR try-on system according to one embodiment of the present disclosure will be described with reference to FIG. 1. As illustrated in FIG. 1, the AR try-on system 1 according to one embodiment of the present disclosure has an information processing apparatus 10, a camera 15, a sensor 17 and a display device 19. A place where the AR try-on system 1 is installed is not particularly limited. For example, the AR try-on system 1 may be installed at user's home or may be installed at a shop.

In the example illustrated in FIG. 1, a plurality of units (the information processing apparatus 10, the camera 15, the sensor 17 and the display device 19) configuring the AR try-on system 1 are separately configured, but the structure of the AR try-on system 1 according to the present disclosure is not limited thereto. A combination of some of the units configuring the AR try-on system 1 may be integrated. For example, a plurality of units configuring the AR try-on system 1 may be incorporated in Smartphone, PDA (Personal Digital Assistants), cell phone, portable music player, portable video processor or portable game player.

The camera 15 (shooting device) shoots objects present in a real space. The objects present in a real space are not particularly limited, and may be creatures such as humans and animals, or any but creatures such as garage or TV stand. In the example illustrated in FIG. 1, a subject A (person, for example) as a real-space object is shot by the camera 15. An image shot by the camera 15 (which may be called shot image) is displayed on the display device 19. The shot image displayed on the display device 19 may be a RGB image. The camera 15 sends the shot image to the information processing apparatus 10.

The sensor 17 has a function of detecting parameters from the real space, and sends the detection data to the information processing apparatus 10. For example, when the sensor 17 is configured of an infrared sensor, the sensor 17 can detect infrared rays from the real space and supply electric signals based on the infrared rays as detection data to the information processing apparatus 10. The information processing apparatus 10 can recognize real-space objects based on the detection data, for example. The type of the sensor 17 is not limited to an infrared sensor. In the example illustrated in FIG. 1, it is assumed that the detection data is supplied from the sensor 17 to the information processing apparatus 10, but the detection data to be supplied to the information processing apparatus 10 may be an image shot by the camera 15.

The information processing apparatus 10 combines virtual objects with a shot image or modifies the shot image depending on a recognition result for real-space objects, thereby processing the shot image. The display device 19 can display an image processed by the information processing apparatus 10.

For example, as illustrated in FIG. 1, the information processing apparatus 10 can recognize the subject A in the real space, and display a try-on image in which a clothes image is combined on the display device 19 in real-time. Herein, the user body is a real-space video, and an image of clothes to be tried on is a virtual object displayed to be overlapped on the real-space video. Thereby, the AR try-on system 1 can provide virtual try-on in real-time.

Herein, with the virtual try-on system, a clothes image is overwritten on a shot image shooting a subject therein, and thus the virtual object (virtual clothes) is always drawn in front of the actual object (subject). Bad effects caused by the overwriting of a clothes image will be described below with reference to FIG. 2 and FIG. 3.

Figure 2:
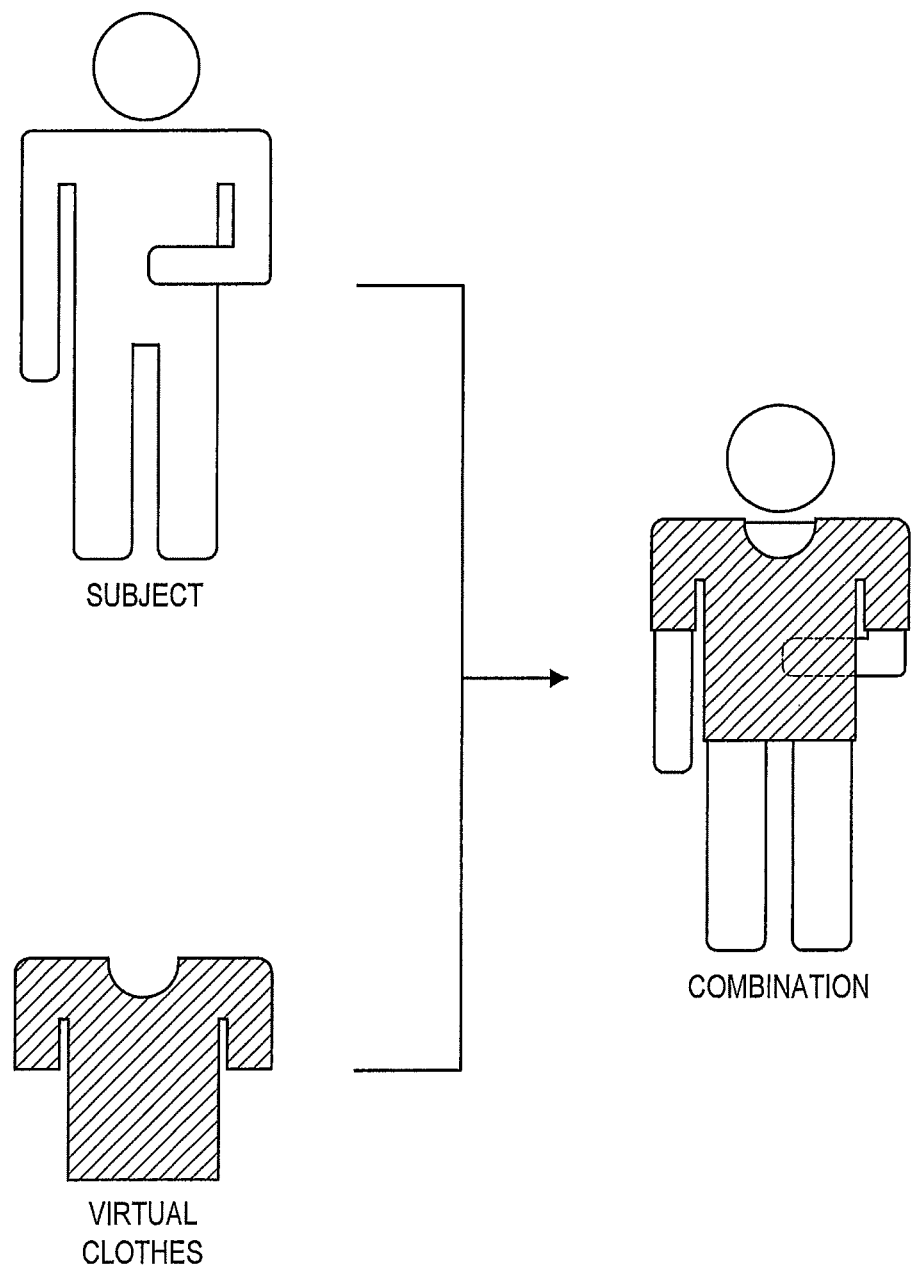
FIG. 2 is a diagram for explaining an exemplary overwritten clothes image.

FIG. 2 is a diagram for explaining an exemplary overwritten clothes image. As illustrated in FIG. 2, if virtual clothes are overwritten on the subject when a hand of the subject is positioned in front of the torso, the hand positioned in front of the torso of the subject is hidden behind the virtual clothes and thus an anteroposterior relationship therebetween is not correctly expressed.

Figure 3:
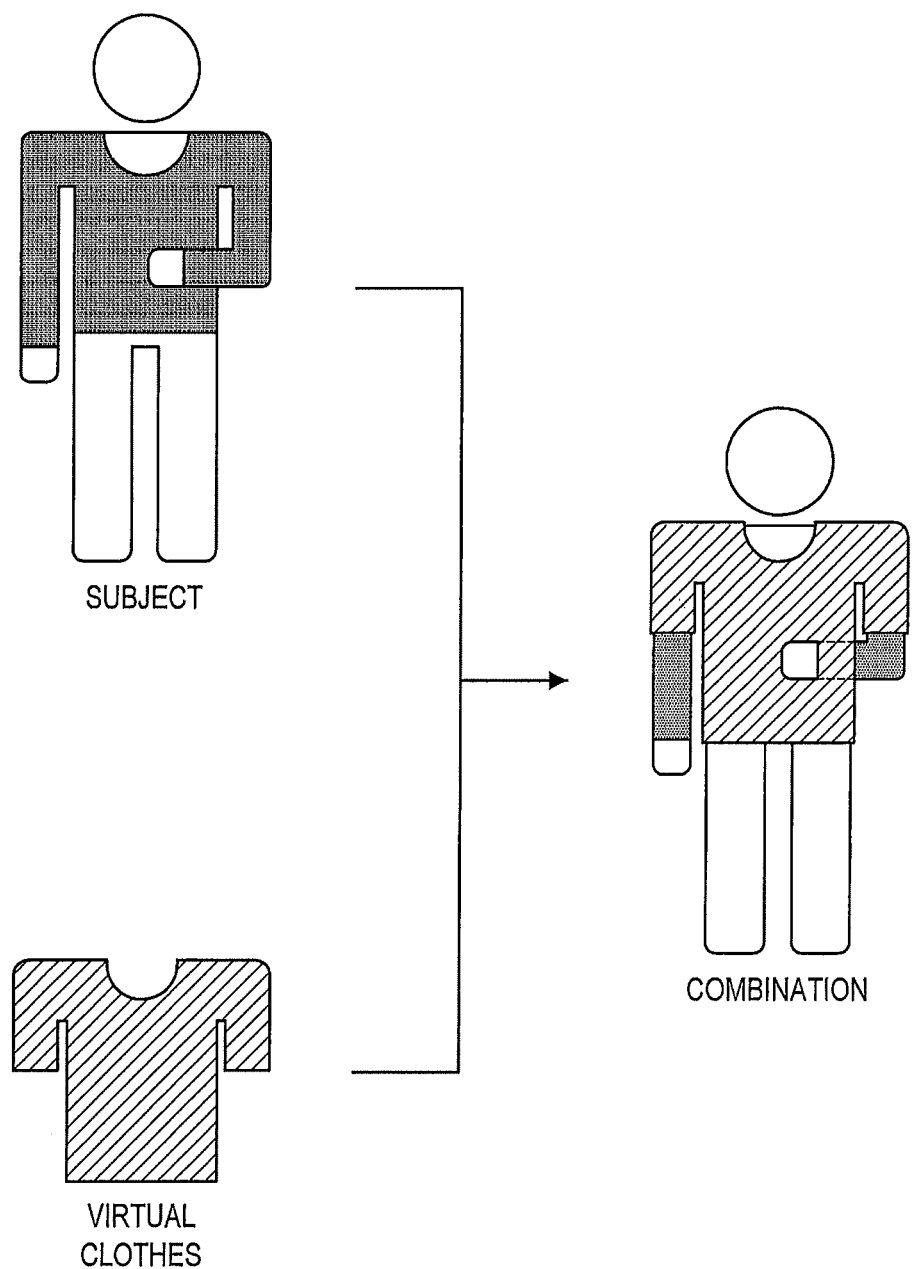
FIG. 3 is a diagram for explaining other exemplary overwritten clothes image.

There is also proposed a method for trying to properly express an anteroposterior relationship by use of color information. For example, a clothes image is not drawn on flesh-colored parts in a shot image. Thereby, when a hand is positioned in front of the torso of the subject, a clothes image is not drawn on the hand. However, when the subject puts nearly flesh-colored clothes on, a clothes image is difficult to properly draw with the method. As illustrated in FIG. 3, when the subject puts long-sleeved clothes on, only the hand looks isolated at the center of the torso with the method.

There is additionally proposed a method for trying to properly express an anteroposterior relationship by segmenting objects in a shot image. The segmentation is to divide an image into regions in units of objects such as "person" and "clothes" and to compare the anteroposterior relationships for each object, and thus it is possible to determine that "'clothes' are in front of 'person'" or "'person' is in front of 'clothes'." However, for example, as illustrated in FIG. 2, it is difficult to consecutively determine that "'clothes' are in front of 'person' and 'person' is in front again" when a hand is positioned in front of the torso. Therefore, it is difficult to correctly determine an anteroposterior relationship between an actual object and a virtual object even with the segmentation.

It was difficult to correctly determine an anteroposterior relationship between each part of one object of "person" such as a hand or the torso described above, and a virtual object. If an anteroposterior relationship cannot be correctly determined, consequently virtual clothes cannot be properly drawn at any parts, which has caused a reduction in accuracy of the virtual try-on system.

The AR try-on system according to one embodiment of the present disclosure determines an anteroposterior relationship between a subject and virtual clothes for each part by use of depth information, and displays a clothes image in an overlapping manner based on the determined anteroposterior relationship. Thus, with the AR try-on system according to the present embodiment, for example, as illustrated in FIG. 1, even when a hand is positioned in front of the torso of the subject A, a try-on image having a correct anteroposterior relationship between the subject and the virtual clothes can be displayed on the display device 19.

2. Structure of Information Processing Apparatus

Figure 4:
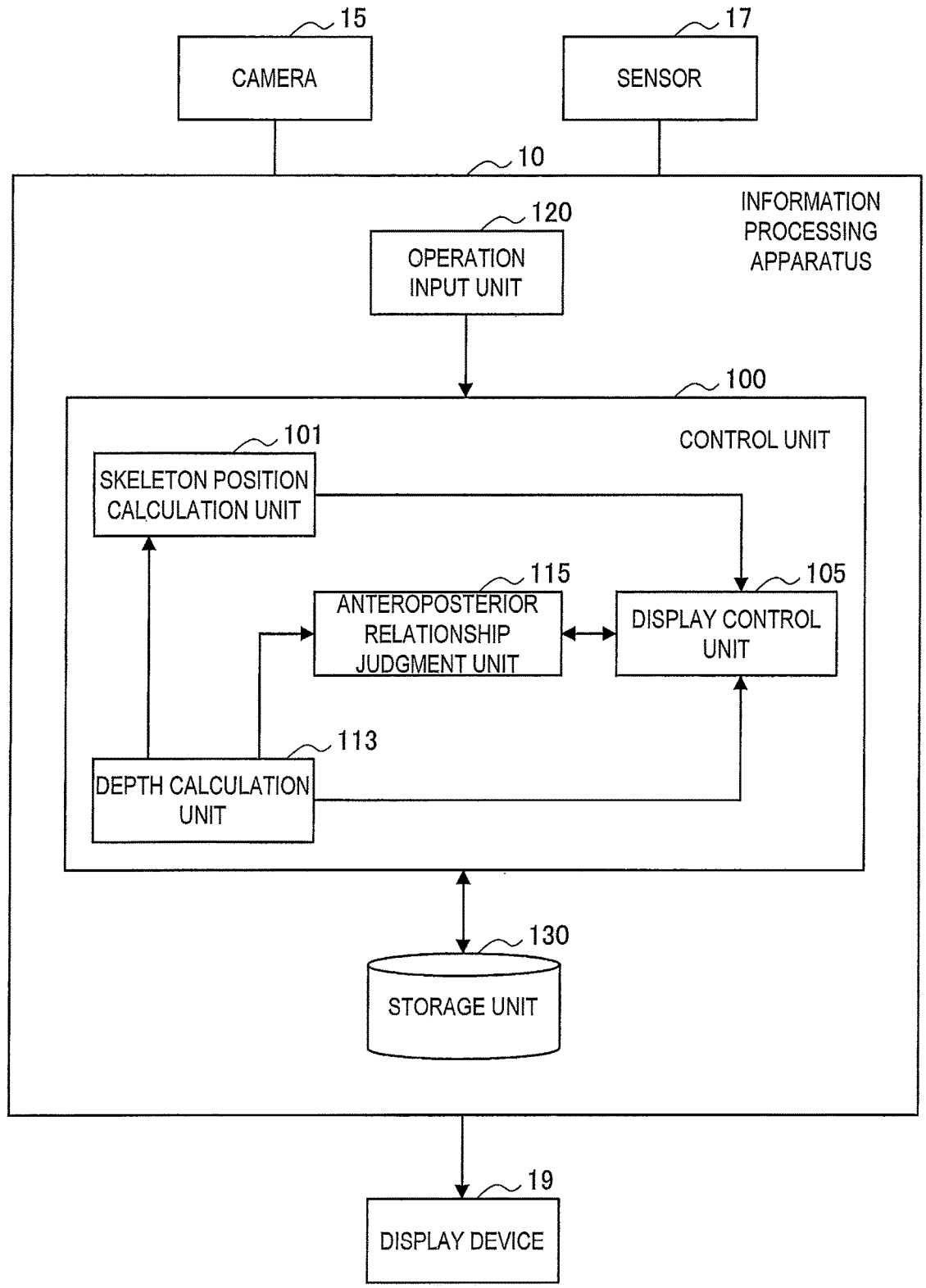
FIG. 4 is a block diagram illustrating a structure of an information processing apparatus according to one embodiment of the present disclosure.

A structure of the information processing apparatus 10 achieving the AR try-on system according to the present disclosure will be described below with reference to FIG. 4. As illustrated in FIG. 4, the information processing apparatus 10 has a control unit 100, an operation input unit 120 and a storage unit 130. The control unit 100 has a skeleton position calculation unit 101, a display control unit 105, a depth calculation unit 113 and an anteroposterior relationship judgment unit 115. The information processing apparatus 10 is connected with the camera 15, the sensor 17 and the display device 19 in a wired or wireless manner.

The control unit 100 corresponds to a processor such as CPU (Central Processing Unit) or DSP (Digital Signal Processor). The control unit 100 executes a program stored in the storage unit 130 or other storage medium thereby to operate various functions of the control unit 100 described later. All of the respective blocks configuring the control unit 100 may not be incorporated in the same device and part of them may be incorporated in other device (such as server).

The storage unit 130 stores programs and data for the processings by the information processing apparatus 10 by use of a storage medium such as semiconductor memory or hard disk. For example, it stores a program for causing a computer to function as the control unit 100. Further, the storage unit 130 stores data to be used by the control unit 100 therein, for example. The storage unit 130 according to the present embodiment stores 3D data on clothing ornaments as virtual objects to be displayed. In the present specification, the clothing ornaments include clothes and accessories. The accessories include glasses, hats, belts and the like.

The operation input unit 120 is configured of an input means such as mouse, keyboard, touch panel, button, microphone, switch, lever or remote controller by which the user inputs information, and an input control circuit for generating an input signal based on user's input and outputting it into the control unit 100. The user can instruct to power ON/OFF the power supply of the information processing apparatus 10 or to activate an AR try-on system program by operating the operation input unit 120.

The camera 15 (shooting device) shoots a real space by use of a shooting device such as CCD (Charge Coupled Device) or CMOS (Complementary Metal Oxide Semiconductor), thereby generating a shot image. According to the embodiment of the present disclosure, the camera 15 is assumed to be configured separately from the information processing apparatus 10, but the camera 15 may be part of the information processing apparatus 10.

Figure 5:
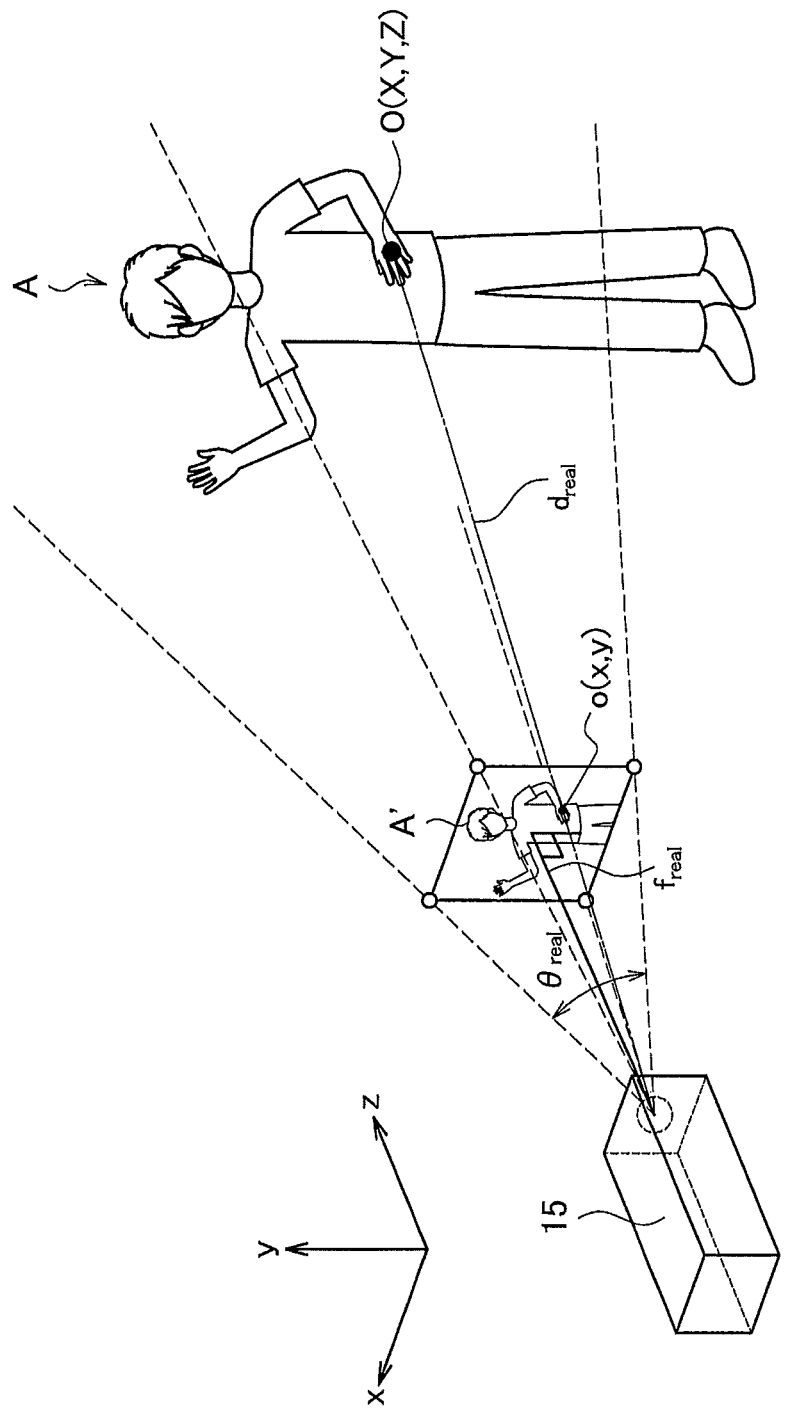
FIG. 5 is a diagram for explaining a positional relationship between a camera and a subject in a real space, and a shot image shooting the subject therein.

The camera 15 supplies setting information of the camera 15 at the time of shooting to the information processing apparatus 10. Herein, FIG. 5 illustrates a diagram for explaining a positional relationship between the camera 15 and the subject A in a real space, and a shot image A' shooting the subject A therein. In FIG. 5, a focal distance $f_{real}$ between the main point as an optical center of the lens (not illustrated) of the camera 15 and an imaging device (not illustrated) of the camera 15, and a shot image A' (2D, xy coordinate) of the subject A (3D, xyz coordinate) shot on the imaging device are illustrated on the side of the subject for convenience. A distance $d_{real}$ between the camera 15 and the subject A is calculated as depth information as described later. An angle of view $\theta_{real}$ of the camera 15 is determined mainly depending on the focal distance $f_{real}$. The camera 15 supplies the setting information of the camera 15 such as focal distance $f_{real}$ (or angle of view $\theta_{real}$) and the number of pixels of the shot image A' to the information processing apparatus 10.

The sensor 17 has a function of detecting parameters from a real space. For example, when the sensor 17 is configured of an infrared sensor, the sensor 17 can detect an infrared ray from a real space and supply an electric signal based on the infrared ray as detection data to the information processing apparatus 10. The type of the sensor 17 is not limited to an infrared sensor. When an image shot by the camera 15 is supplied as detection data to the information processing apparatus 10, the sensor 17 may not be present.

The display device 19 is a display module configured of LCD (Liquid Crystal Display), OLED (Organic light-Emitting Diode) or CRT (Cathode Ray Tube). According to the embodiment of the present disclosure, the display device 19 is assumed to be configured separately from the information processing apparatus 10, but the display device 19 may be part of the information processing apparatus 10.

Subsequently, a functional structure of the control unit 100 will be described. As described above, the control unit 100 has the skeleton position calculation unit 101, the display control unit 105, the depth calculation unit 113 and the anteroposterior relationship judgment unit 115.

(Skeleton Position Calculation Unit 101)

The skeleton position calculation unit 101 calculates skeleton positions of an object shot in a shot image based on detection data. A method for calculating real-space skeleton positions of an object shot in a shot image is not particularly limited. For example, the skeleton position calculation unit 101 recognizes a region in which an object is present in a shot image (which will be also denoted as "object presence region" below) and acquires depth information of the object in the shot image from the depth calculation unit 113. Then, the skeleton position calculation unit 101 may recognize the real-space sites (such as head, left shoulder, right shoulder and abdomen) of the object shot in the shot image, and calculate the center position of each site as a skeleton position based on the depths and shape (characteristic amount) of the object presence region. The skeleton position calculation unit 101 uses a characteristic amount dictionary stored in the storage unit 130 to correlate the characteristic amounts determined from the shot image with the characteristic amount of each site of the object previously registered in the characteristic amount dictionary, thereby recognizing the sites of the object contained in the shot image.

Various methods are assumed as a method for recognizing an object presence region. For example, when a shot image is supplied as detection data to the information processing apparatus 10, the skeleton position calculation unit 101 can recognize an object presence region based on a difference value between the shot image in which the object is not shot and the shot image in which the object is shot. More specifically, the skeleton position calculation unit 101 can recognize, as an object presence region, a region in which a difference value between the shot image in which the object is not shot and the shot image in which the object is shot exceeds a threshold.

For example, when parameters detected by the sensor 17 are supplied as detection data to the information processing apparatus 10, the skeleton position calculation unit 101 can recognize an object presence region based on the detection data. More specifically, the skeleton position calculation unit 101 can recognize, as an object presence region, a region in which the detected amount of infrared rays exceeds a threshold.

The skeleton position calculation unit 101 recognizes the real-space sites (such as head and shoulders) of the object shot in the shot image based on the depths and shape (characteristic amount) of the object presence region acquired with each method described above, and calculates the coordinate of the skeleton position of each site. Skeleton information containing skeleton positions of one or more sites configuring the subject A calculated in the skeleton position calculation unit 101 will be described below with reference to FIG. 6.

Figure 6:
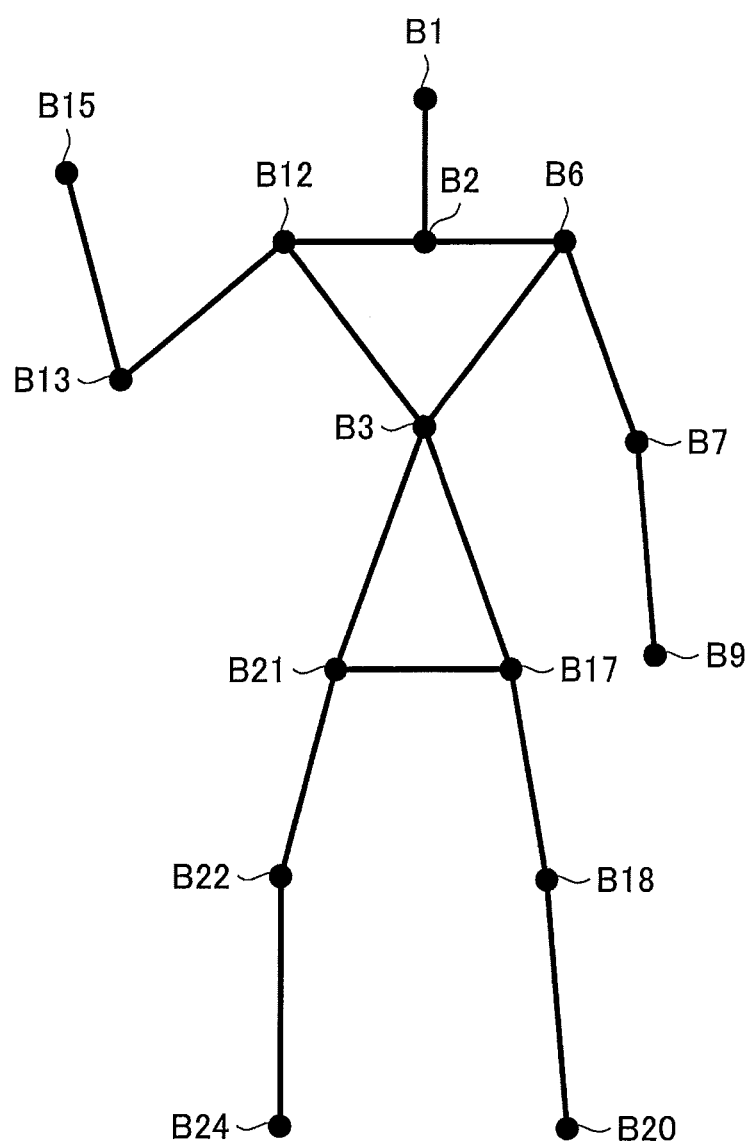
FIG. 6 is a diagram for explaining skeleton information according to one embodiment of the present disclosure.

FIG. 6 is a diagram for explaining skeleton information. In the example illustrated in FIG. 6, the skeleton information is indicated with the coordinates B1 to B3, B6, B7, B9, B12, B13, B15, B17, B18, B20 to B22, and B24 indicating the positions of 15 sites configuring the subject A, but the number of sites contained in the skeleton information is not particularly limited.

The coordinate B1 indicates a coordinate of "Head", the coordinate B2 indicates a coordinate of "Neck", the coordinate B3 indicates a coordinate of "Torso", the coordinate B6 indicates a coordinate of "Right Shoulder" and the coordinate B7 indicates a coordinate of "Right Elbow." The coordinate B9 indicates a coordinate of "Right Hand", the coordinate B12 indicates a coordinate of "Left Shoulder", the coordinate B13 indicates a coordinate of "Left Elbow", and the coordinate B15 indicates a coordinate of "Left Hand."

The Coordinate B17 indicates a coordinate of "Right Hip", the coordinate B18 indicates a coordinate of "Right Knee", the coordinate B20 indicates a coordinate of "Right Foot", and the coordinate B21 indicates a coordinate of "left Hip." The coordinate B22 indicates a coordinate of "Left Knee" and the coordinate B24 indicates a coordinate of "Left Foot."

(Depth Calculation Unit 113)

The depth calculation unit 113 calculates depth information of an object in a shot image based on detection data. A method for calculating a real-space depth of the object shot in the shot image (herein, a distance from the camera 15) is not particularly limited, and various methods are assumed therefor.

For example, the depth calculation unit 113 can calculate depth information of an object in a shot image based on the parameters detected by the sensor 17. More specifically, when a light such as infrared ray is irradiated on an object from an irradiation device (not illustrated), the depth calculation unit 113 analyzes the light detected by the sensor 17 thereby to calculate depth information of the object in the shot image.

For example, the depth calculation unit 113 can calculate depth information of an object in a shot image based on a phase delay of the light detected by the sensor 17. The method may be called TOF (Time Of Flight) system. Alternatively, when a light irradiated from an irradiation device (not illustrated) is configured of a well-known pattern, the depth calculation unit 113 analyzes a distortion of the pattern configuring the light detected by the sensor 17, thereby to calculate depth information of the object in the shot image.

The depth calculation unit 113 provided in the control unit 100 has been described above. Herein, the imaging device having a function of calculating depth information of an object in a shot image is called depth camera, and can be realized by a stereo camera or laser range scanner. When the information processing apparatus 10 can acquire depth information from an external device such as depth camera, the depth calculation unit 113 may not be present.

Figure 7:
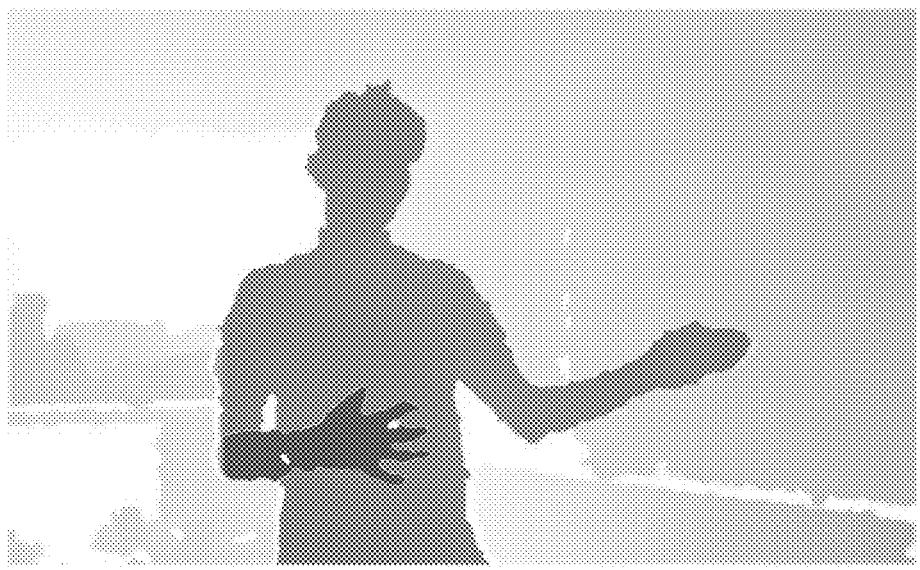
FIG. 7 is a diagram for explaining depth information according to one embodiment of the present disclosure.

Depth information calculated by the depth calculation unit 113 or acquired from a depth camera or the like will be described below. The depth information is acquired in an actual dimension (in centimeters) per pixel of a shot image, for example. FIG. 7 is a diagram in which such depth information is expressed in an image. In the image illustrated in FIG. 7, a degree of depth is indicated in a gray scaled manner. Specifically, a higher degree of depth (a longer distance from the camera 15) is indicated as being whiter and a lower degree of depth (closer distance from the camera 15) is indicated as being blacker. In this way, the depth information in the shot image can be acquired in an actual dimension (in centimeters) per pixel.

(Anteroposterior Relationship Judgment Unit 115)

The anteroposterior relationship judgment unit 115 judges an anteroposterior relationship between a shot actual object and a virtual object for each part by use of depth information.

More specifically, for example, the anteroposterior relationship judgment unit 115 compares depth information of an object in a shot image (see the distance $d_{real}$ indicated in FIG. 5) with depth information of an object in a virtual image (see the distance $d_{vertual}$ illustrated in FIG. 8), thereby judging an anteroposterior relationship per pixel.

The anteroposterior relationship judgment unit 115 may acquire the depth information of the object in the shot image from the depth calculation unit 113 and acquire the depth information of the object in the virtual image from the display control unit 105.

Herein, it can be assumed that as the depth is smaller (shallower), the distance between the camera and the object is shorter. It can be assumed that as the depth is larger (deeper), the distance between the camera and the object is longer. Thus, the anteroposterior relationship judgment unit 115 according to the present embodiment compares the depth information of the object in the shot image with the depth information of the object in the virtual image, and judges that the object having a smaller depth is positioned in front and the object having a larger depth is positioned behind. Further, the anteroposterior relationship judgment unit 115 outputs the judgment result to the display control unit 105.

(Display Control Unit 105)

The display control unit 105 generates an AR try-on image in which virtual clothes are displayed to be overlapped on a subject shot in a shot image, and displays it on the display device 19. The display control unit 105 according to the present embodiment displays a virtual image to be overlapped based on an anteroposterior relationship for each part between the object (such as the subject A) in the shot image and the virtual object (such as virtual clothes C) judged by the anteroposterior relationship judgment unit 115. Thereby, the display control unit 105 according to the present embodiment can control to display a correct AR try-on image even when the anteroposterior relationship between the subject A and the virtual clothes C is complicated.

Figure 8:
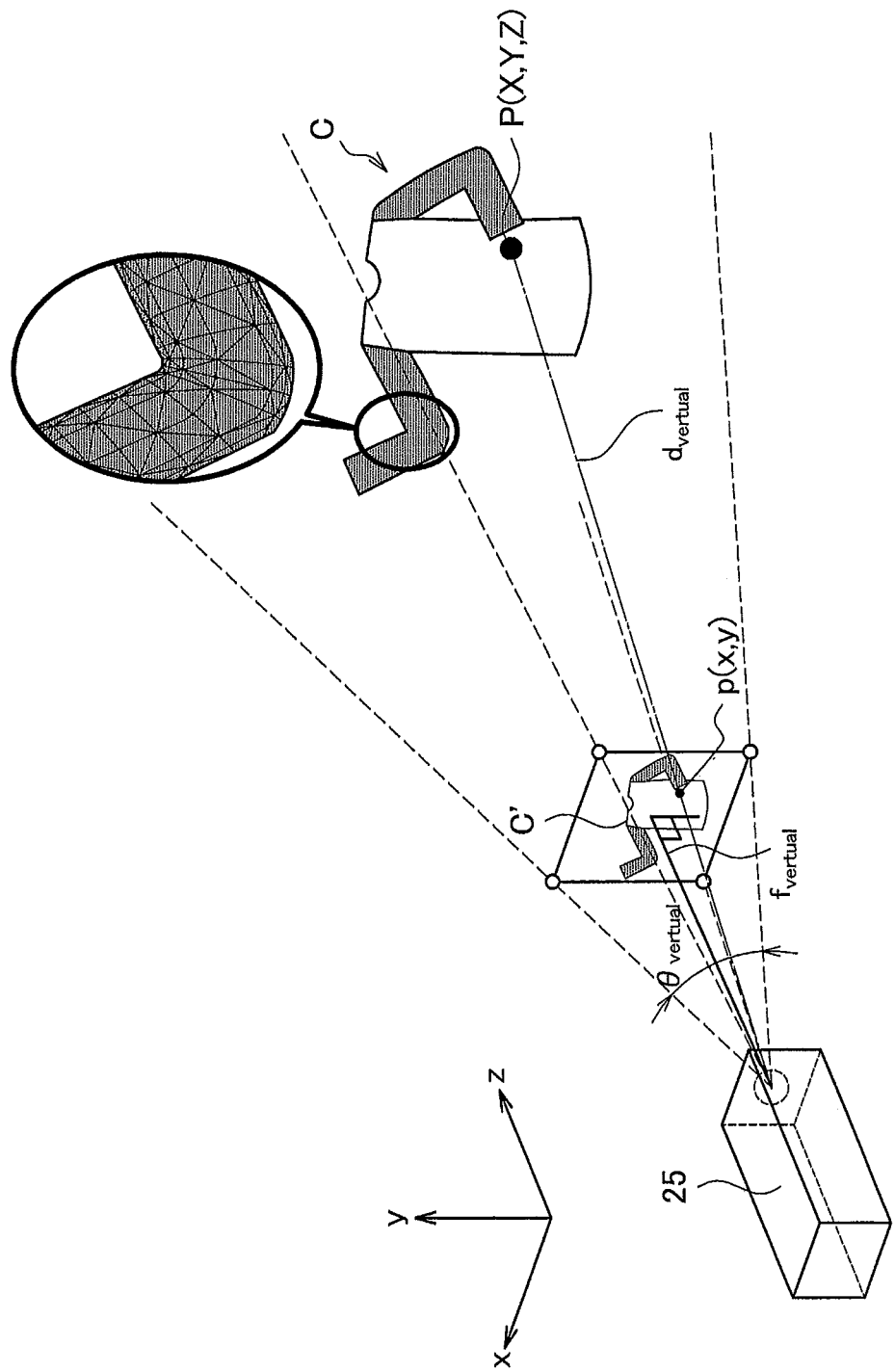
FIG. 8 is a diagram for explaining a positional relationship between a virtual camera and virtual clothes in a virtual space, and a virtual clothes image projecting the virtual clothes therein.

Generation of a virtual image to be overlapped on a shot image will be described below with reference to FIG. 8. FIG. 8 is a diagram for explaining a positional relationship between a virtual camera 25 and the virtual clothes C in a virtual space, and a virtual clothes image C' (also called virtual image) in which the virtual clothes C are projected (rendered). In FIG. 8, the rendered virtual clothes image C' is illustrated on the side of the virtual clothes similarly to the shot image A' shooting a real space therein illustrated in FIG. 5

The setting (internal parameters) of the virtual camera 25 is determined according to the setting (internal parameters) of the camera 15 for shooting a real space. The setting (internal parameters) of the camera is a focal distance f, an angle of view $\theta$, the number of pixels, and the like, for example. The display control unit 105 sets the virtual camera 25 to match with the real-space camera 15 (which may be called initialization).

Then, the display control unit 105 arranges the virtual clothes C adjusted for the skeleton positions of the subject at a position distant from the virtual camera 25 by the same distance $d_{vertual}$ as the real-space distance $d_{real}$ between the camera 15 and the subject A based on the depth information of the object in the shot image. The display control unit 105 may generate the virtual clothes C based on previously-modeled 3D data. For example, as illustrated in FIG. 8, the surface of the virtual clothes C are configured in a set of triangles so that the display control unit 105 can express the 3D shape of the virtual clothes more realistically. When the skeleton positions of the subject A change over time, the display control unit 105 can change the arrangement of the virtual clothes C for tracking the skeleton positions.

The rendered or 3D clothes image C is projected onto a 2D plan image by the virtual camera 25 so that the display control unit 105 acquires the virtual clothes image C' (virtual image).

When displaying the clothes image C' to be overlapped on the shot image A' (see FIG. 5), the display control unit 105 controls the presence of the drawn clothes image C' based on the judgment result by the anteroposterior relationship judgment unit 115 for each part (such as pixel). The display control by the display control unit 105 will be described in the following <3. Display control> in detail.

The structure of the information processing apparatus 10 achieving the AR try-on system according to one embodiment of the present disclosure has been described above in detail. Subsequently, the display control for an AR try-on image by the information processing apparatus 10 will be described.

3. Display Control

Figure 9:
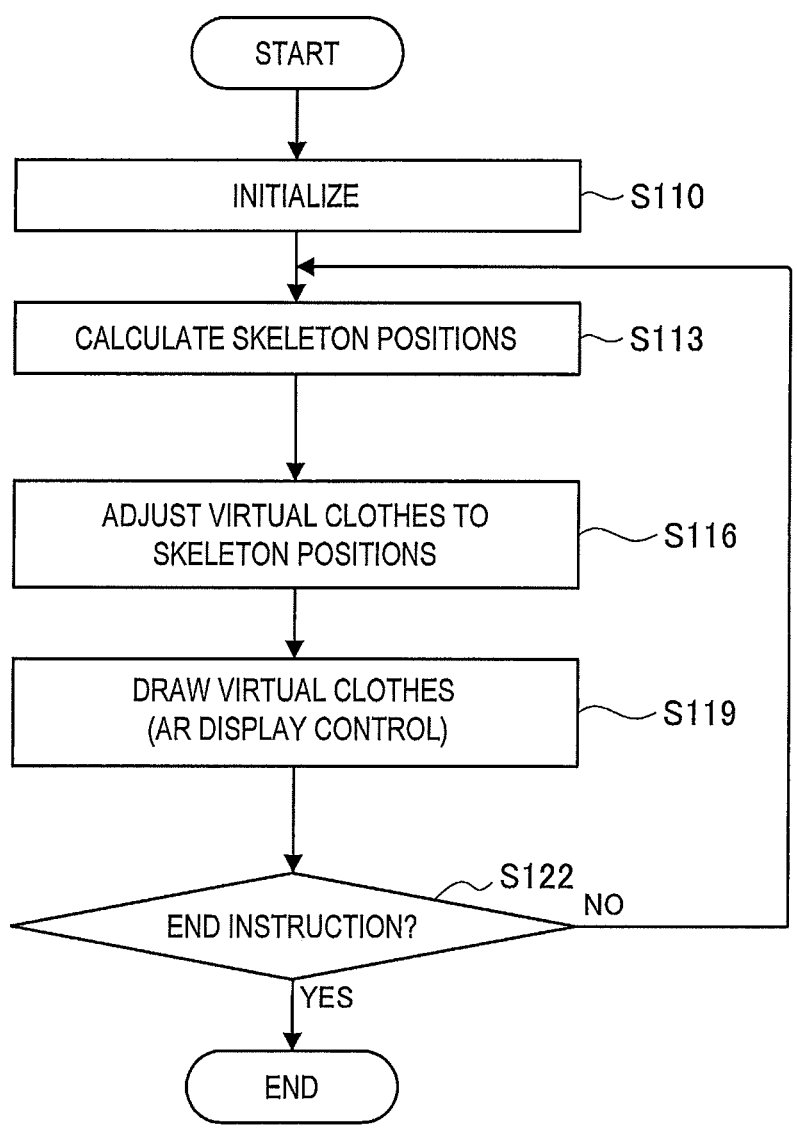
FIG. 9 is a flowchart illustrating basic display control processings in AR try-on image display according to one embodiment of the present disclosure.

[3-1. Basic Display Control]
FIG. 9 is a flowchart illustrating basic display control processings on an AR try-on image by the information processing apparatus 10. As illustrated in FIG. 9, at first, in step S110, the display control unit 105 initializes the setting of the virtual camera 25 in a virtual space to match with the setting of the camera 15 in a real space.

Then, in step S113, the skeleton position calculation unit 101 calculates skeleton positions (xyz coordinates) of the subject A in a shot real space, and outputs it to the display control unit 105.

Next, in step S116, the display control unit 105 arranges the virtual clothes C to be adjusted to the skeleton positions (xyz coordinates) of the subject A in the virtual space.

Then, in step S119, the display control unit 105 renders the virtual clothes C to acquire a clothes image C' (virtual image), draws an AR try-on image in which the clothes image C' is overlapped on the shot image A', and displays it on the display device 19 (AR display control).

The information processing apparatus 10 repeatedly performs steps S113 to S119 in step S122 until an end instruction is made. Thereby, the information processing apparatus 10 can provide an AR try-on image tracking the motions of the subject A in real-time.

The basic display control processings have been described above. The information processing apparatus 10 according to the present embodiment controls to draw an AR try-on image based on the anteroposterior relationship between the subject A and the virtual clothes C in step S119. The drawing of an AR try-on image in an anteroposterior relationship according to the present embodiment will be specifically described below with reference to FIG. 10.

Figure 10:
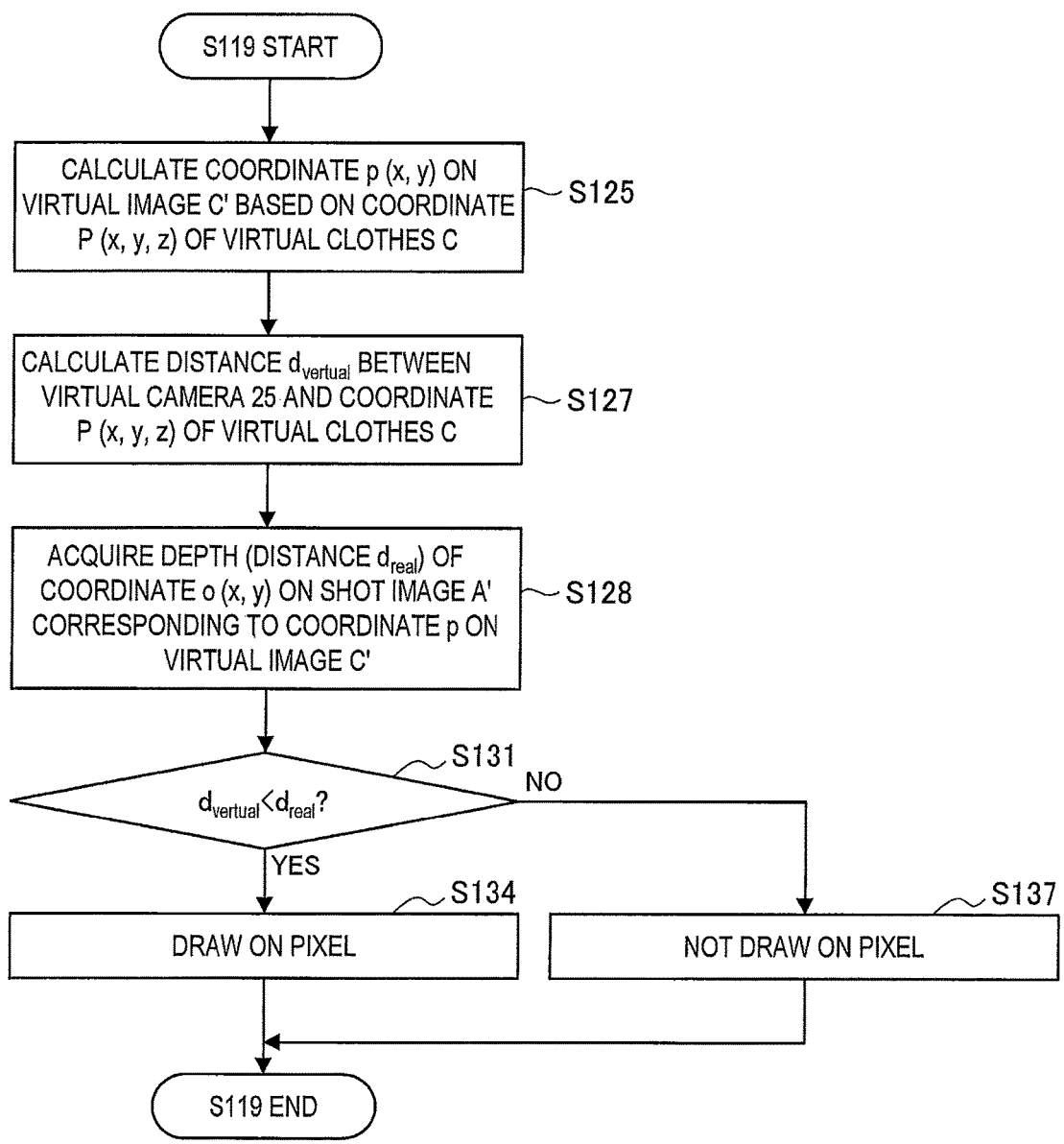
FIG. 10 is a flowchart illustrating AR try-on image drawing control based on depth information according to one embodiment of the present disclosure.

[3-2. Drawing of AR Try-on Image in Anteroposterior Relationship]
FIG. 10 is a flowchart illustrating AR try-on image drawing control processings based on depth information by the information processing apparatus 10 according to the present embodiment. More specifically, FIG. 10 illustrates that the display control unit 105 controls the presence of the drawn clothes image C' displayed to be overlapped on the shot image A' based on a judgment result by the anteroposterior relationship judgment unit 115 for each part (such as pixel) in the display control in step S119 illustrated in FIG. 9.

At first, in step S125 in FIG. 10, the display control unit 105 calculates a coordinate p (x, y) of the virtual image C' based on a 3D coordinate P (x, y, z) of the virtual clothes C as illustrated in FIG. 8. For example, the display control unit 105 multiplies the 3D coordinate P (x, y, z) by a projection matrix found from the inner parameters of the camera 15, thereby calculating the 2D coordinate p (x, y) on the image plane.

Then, in step S127, the display control unit 105 calculates a distance $d_{vertial}$ in the virtual space between the virtual camera 25 and the coordinate P (x, y, z) of the virtual clothes C as illustrated in FIG. 8. The display control unit 105 outputs the calculated 2D coordinate p (x, y) and distance $d_{vertual}$ to the anteroposterior relationship judgment unit 115.

Then, in step S128, the anteroposterior relationship judgment unit 115 acquires a real-space depth (see the distance $d_{real}$ illustrated in FIG. 5) at a 2D coordinate o (x, y) of the shot image A' corresponding to the 2D coordinate p (x, y) of the clothes image C' (virtual image). Specifically, for example, the depth at the 2D coordinate o (x, y) of the shot image A' corresponding to the 2D coordinate p of the clothes image C' is acquired based on the depth information per pixel (2D coordinate) as illustrated in FIG. 7 calculate by the depth calculation unit 113. Herein, as illustrated in FIG. 5, a distance $d_{real}$ between the camera 15 and the 3D coordinate O (x, y, z) of the subject A is acquired.

Subsequently, in step S131, the anteroposterior relationship judgment unit 115 compares the distance $d_{vertual}$ in the virtual space and the distance $d_{real}$ in the real space. When the distance $d_{vertual}$ is shorter than the distance $d_{real}$, the anteroposterior relationship judgment unit 115 judges that the virtual clothes C are positioned in front of (closer to) the subject A, and the processing proceeds to step S134. When the distance $d_{vertual}$ is longer than the distance $d_{real}$, the anteroposterior relationship judgment unit 115 judges that the virtual clothes C are positioned behind (far away from) the subject A, and the processing proceeds to step S137. In this way, the anteroposterior relationship judgment unit 115 can judge an anteroposterior relationship between the subject A and the virtual clothes C for each part (per coordinate).

Then, in step S134, when the anteroposterior relationship judgment unit 115 judges that the virtual clothes C are positioned in front of the subject A, the display control unit 105 draws the pixel at the coordinate p of the virtual image C' on the pixel at the coordinate o of the shot image A'.

On the other hand, in step S137, when the anteroposterior relationship judgment unit 115 judges that the virtual clothes C are positioned behind the subject A, the display control unit 105 does not draw the pixel at the coordinate p of the virtual image C' on the pixel at the coordinate o of the shot image A'.

The processings in steps S125 to S137 described above are performed for all the pixels (coordinates) of the clothes image C' displayed to be overlapped on the shot image A'. Thereby, even when the anteroposterior relationship between the subject A and the virtual clothes C is complicated, the display control unit 105 can correctly draw an AR try-on image. An exemplary drawn AR try-on image by the display control unit 105 according to the present embodiment (Exemplary Drawn AR Try-on Image)

Subsequently, exemplary drawn AR try-on images by the display control unit 105 according to the present embodiment will be illustrated in FIG. 11 and FIG. 12.

Figure 11:
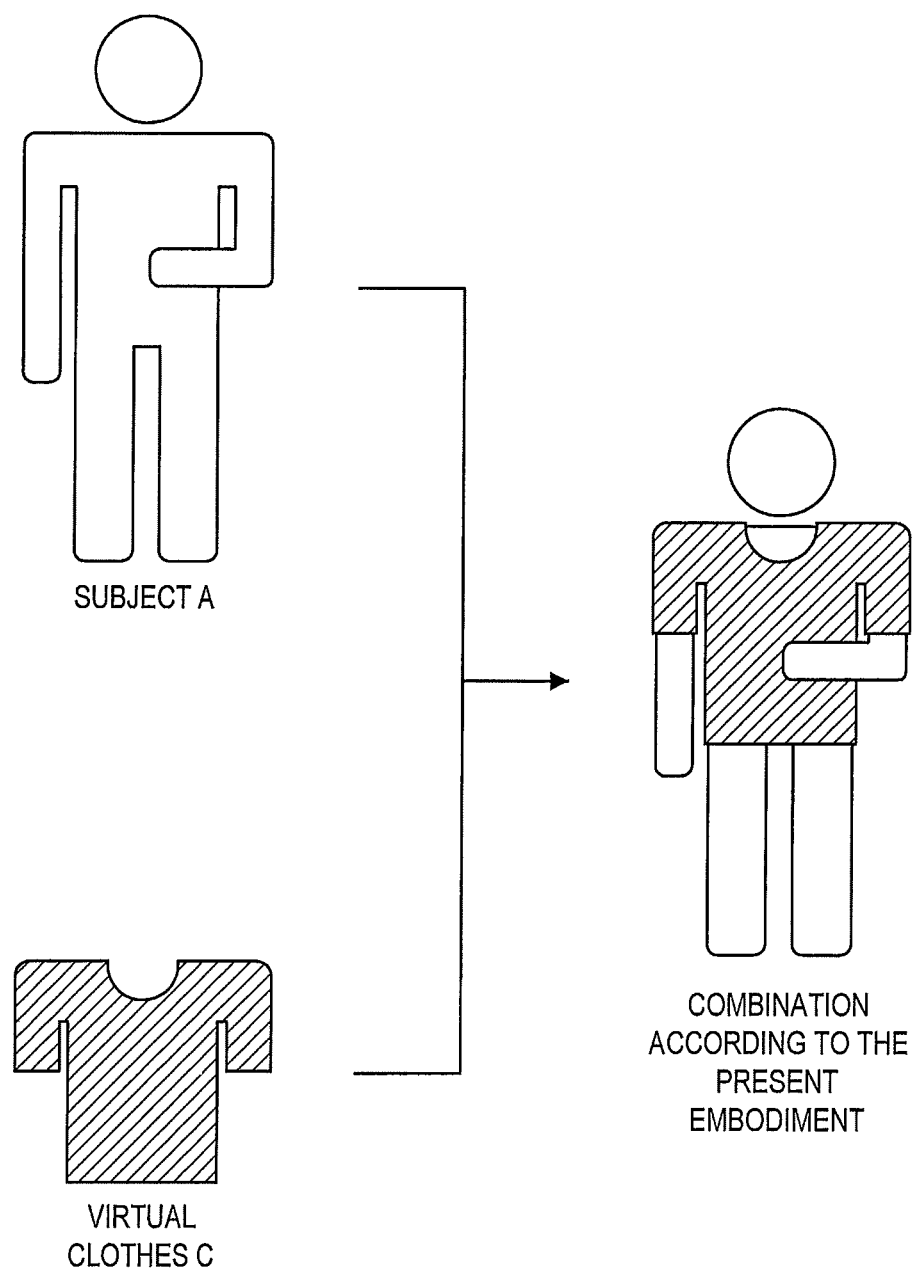
FIG. 11 is a diagram for explaining an exemplary drawn AR try-on image according to one embodiment of the present disclosure.

As illustrated in FIG. 11, even when a hand of the subject A is positioned in front of the torso, an anteroposterior relationship is judged for each part when the virtual clothes C are displayed to be overlapped (combined), and thus the virtual clothes C are not drawn on the hand of the subject A positioned in front of the torso unlike the general combination illustrated in FIG. 2.

Figure 12:
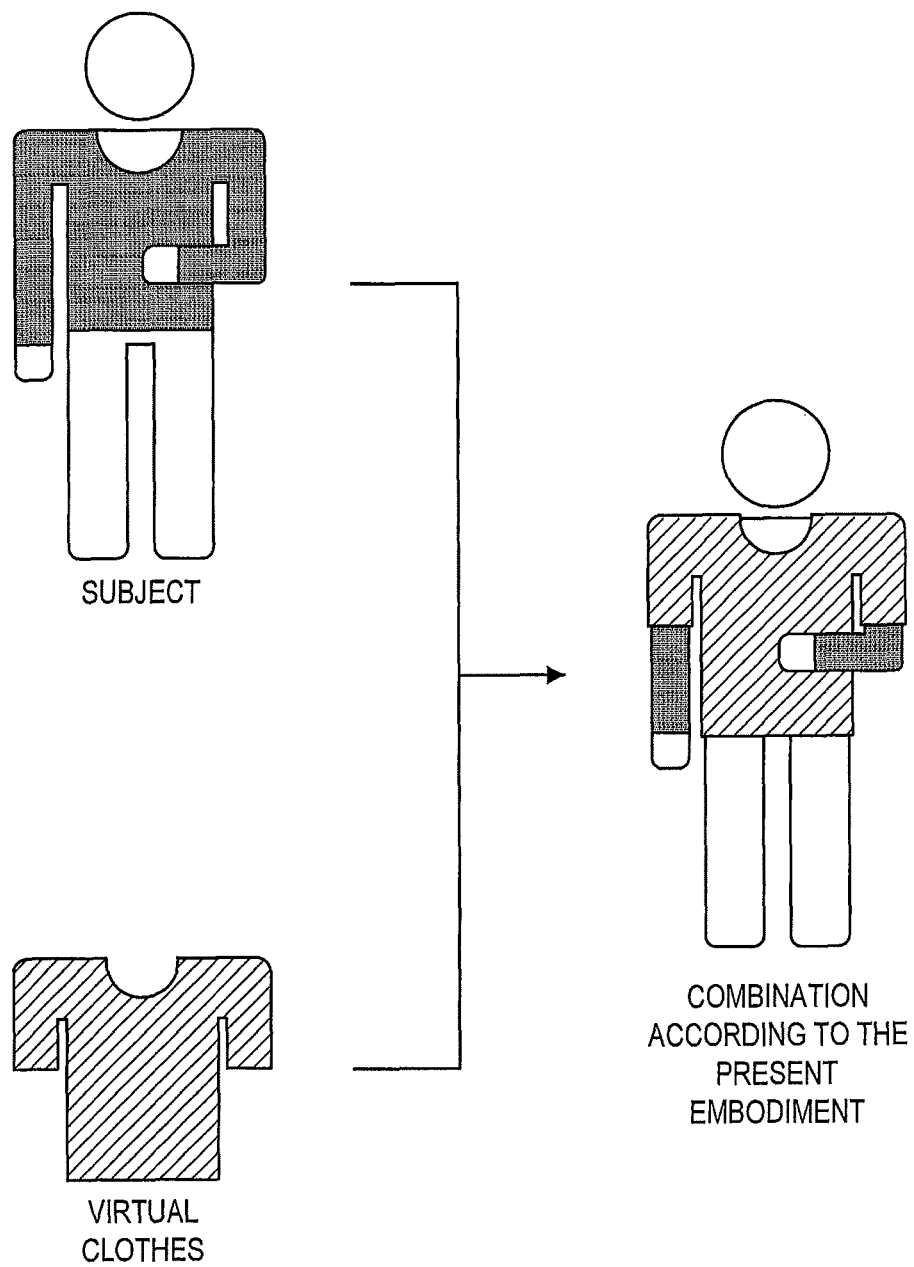
FIG. 12 is a diagram for explaining an exemplary drawn AR try-on image according to one embodiment of the present disclosure.

As illustrated in FIG. 12, even when the subject A puts long-sleeved clothes on and a hand is positioned in front of the torso, an anteroposterior relationship is judged for each part according to the present embodiment and thus the virtual clothes C are not drawn on the hand of the subject A positioned in front of the torso, unlike the combination based on color information described above in FIG. 3.

4. Conclusion

As described above, with the AR try-on system according to one embodiment of the present disclosure, the depth of the subject A in the shot image is compared with the depth of the virtual clothes C in the virtual image for each part, thereby judging an anteroposterior relationship between the subject A and the virtual clothes C for each part. The AR try-on system according to the present embodiment can draw an AR try-on image in which the anteroposterior relationship between the subject A and the virtual clothes C is correctly expressed based on the judgment result.

The preferred embodiment of the present disclosure has been described above with reference to the accompanying drawings, whilst the present disclosure is not limited to the above examples, of course. A person skilled in the art may find various alternations and within the scope of the appended claims, and it should be understood that they will naturally come under the technical scope of the present disclosure.

For example, the AR try-on system has been described mainly assuming that a hand of the subject A is positioned in front of the torso of the subject A in a complicated anteroposterior relationship, but is not limited thereto and may be applied to a case in which the subject A has a bag or the like in front of the body. Further, it can be applied to a case in which an obstacle (such as other person, pole or box) is present in front of the subject A.

The above AR try-on system has been described above mainly assuming try-on of virtual clothes, but the objects to be tried on are not limited to clothes, and may be accessories such as glasses, hat, and belt.

The above AR try-on system has been described assuming that the subject is a person, but the subject is not limited to person, and may be an animal such as dog or cat. In this case, it is possible to provide an AR try-on system for displaying a pet clothes image to be overlapped on a shot image shooting an animal therein.

The technique according to the present embodiment for judging an anteroposterior relationship between an actual object and a virtual object for each part by use of depth information and performing AR display control based on the judged anteroposterior relationship is not limited to the above AR try-on system, and can be of course applied to various AR display control.

Additionally, the present technology may also be configured as below.

(1)

An information processing apparatus including:

a judgment unit for judging an anteroposterior relationship between a shot actual object and a virtual object for each part by use of depth information; and a display control unit for displaying a virtual image in which the virtual object is projected to be overlapped on a shot image in which the actual object is shot based on the anteroposterior relationship judged by the judgment unit.

(2)

The information processing apparatus according to (1), wherein the judgment unit compares a depth of the actual object with a depth of the virtual object, and judges an anteroposterior relationship depending on the magnitudes of the depths.

(3)

The information processing apparatus according to (1) or (2), including:

a depth calculation unit for calculating a depth of a shot subject based on detection data detected from a real space, wherein the judgment unit compares a depth of the subject calculated by the depth calculation unit with a depth of a virtual clothing ornament thereby to judge an anteroposterior therebetween for each part, and wherein the display control unit displays a virtual clothing ornament image in which the clothing ornament is projected to be overlapped on a shot image in which the subject is shot based on the anteroposterior relationship judged by the judgment unit.

(4)

The information processing apparatus according to (3), wherein the display control unit controls the presence of the drawn virtual clothing ornament image per pixel based on the judgment result of the anteroposterior relationship per pixel by the judgment unit.

(5)

A display control method including the steps of:

judging an anteroposterior relationship between a shot actual object and a virtual object for each part by use of depth information; and displaying a virtual image in which the virtual object is projected to be overlapped on a shot image in which the actual object is shot based on the anteroposterior relationship judged in the judgment step.

(6)
A program for causing a computer to perform:
a processing of judging an anteroposterior relationship between a shot actual object and a virtual object for each part by use of depth information; and
a processing of displaying a virtual image in which the virtual object is projected to be overlapped on a shot image in which the actual object is shot based on the anteroposterior relationship judged by the judgment processing.

(7)
The program according to (6),
wherein the judgment processing compares a depth of the actual object with a depth of the virtual object thereby to judge an anteroposterior relationship depending on the magnitudes of the depths.

(8)
The program according to (6) or (7), for causing the computer to further perform a processing of calculating a depth of a shot subject based on detection data detected from a real space,
wherein the judgment processing compares a depth of the subject calculated by the processing of calculating a depth with a depth of a virtual clothing ornament thereby to judge an anteroposterior relationship for each part, and
wherein the display processing displays a virtual clothing ornament image in which the clothing ornament is projected to be overlapped on a shot image in which the subject is shot based on the anteroposterior relationship judged by the judgment processing.

(9)
The program according to (8),
wherein the display processing controls the presence of the drawn virtual clothing ornament image per pixel based on the judgment result of the anteroposterior relationship per pixel by the judgment processing.

REFERENCE SIGNS LIST 10 information processing apparatus
15 camera
17 sensor
19 display device
100 control unit
101 skeleton position calculation unit
105 display control unit
113 depth calculation unit
115 anteroposterior relationship judgment unit
120 operation input unit
130 storage unit
a subject
b coordinate (skeleton position)
c virtual clothes

The invention claimed is:

1. An information processing apparatus comprising: circuitry configured to:
acquire actual object depth information of different portions of an actual object based on an actual distance of respective portions of the actual object from an object imaging device which acquires a shot image of the actual object;
determine virtual object depth information of different portions of a virtual object based on a virtual distance of respective portions of the virtual object from a virtual imaging device at a location corresponding to the object imaging device;
acquire pixels of a respective portion of the shot image, the acquired shot image pixels being a function of the actual distance to the corresponding portion of the actual object from the object imaging device;
acquire pixels of a respective portion of an image of the virtual object, the acquired virtual object image pixels being a function of the virtual distance to the corresponding portion of the virtual object from the virtual imaging device;
determine an anteroposterior relationship between the actual object within the shot image obtained by the object imaging device and the virtual object for each of the portions of the actual object and the corresponding portions of the virtual object by comparing values of the actual distance of a respective portion of the actual object and the virtual object distance of the corresponding portion of the virtual object from their respective object imaging device and virtual imaging device; and
control a display to display the pixels of the portions of the virtual object image pixels and not the shot image pixels of the corresponding portions of the shot image when the portions of the virtual object are determined to be located in front of the actual object or display the shot image pixels of the portions of the shot image and not the virtual object image pixels of the corresponding portions of the virtual image when the portions of the virtual object are determined to be located behind the actual object so that the objects are displayed in accordance with the determined anteroposterior relationship.

2. The information processing apparatus of claim 1 wherein the actual object is a part of body of a human.

3. The information processing apparatus of claim 2 wherein the actual object is a hand.

4. The information processing apparatus of claim 1 wherein the display is controlled on the basis of pixels of the actual object and pixels of the virtual object.

5. The information processing apparatus of claim 1 wherein the display is controlled to display the portions of the virtual object when the portions of the virtual object are determined to be closer to the virtual imaging device than the distance of the portions of the actual object from the object imaging device.

6. The information processing apparatus of claim 1 wherein the display is controlled to display the portions of the shot image when the portions of the actual object corresponding to the portions of the shot image are determined to be closer to the object imaging device than the distance of the portions of the virtual object from the virtual imaging device.

7. A display control method comprising the steps of:
acquiring actual object depth information of different portions of an actual object based on an actual distance of respective portions of the actual object from an object imaging device which acquires a shot image of the actual object;
determining virtual object depth information of different portions of a virtual object based on a virtual distance of respective portions of the virtual object from a virtual imaging device at a location corresponding to the object imaging device;
acquiring pixels of a respective portion of the shot image, the acquired shot image pixels being a function of the actual distance to the corresponding portion of the actual object from the object imaging device;
acquiring pixels of a respective portion of an image of the virtual object, the acquired virtual object image pixels being a function of the virtual distance to the corresponding portion of the virtual object from the virtual imaging device;

determining an anteroposterior relationship between the actual object within Hall the shot image obtained by the object imaging device and the virtual object for each of the portions of the actual object and the corresponding portions of the virtual object by comparing values of the actual distance of a respective portion of the actual object and the virtual object distance of the corresponding portion of the virtual object from their respective object imaging device and virtual imaging device; and displaying the pixels of the portions of the virtual object image pixels and not the shot image pixels of the corresponding portions of the shot image when the portions of the virtual object are determined to be located in front of the actual object or displaying the shot image pixels of the portions of the shot image and not the virtual object image pixels of the corresponding portions of the virtual image when the portions of the virtual object are determined to be located behind the actual object so that the objects are displayed in accordance with the determined anteroposterior relationship.

8. A non-transitory computer readable medium on which is stored a program for causing a computer to control a display by:

acquiring actual object depth information of different portions of an actual object based on an actual distance of respective portions of the actual object from an object imaging device which acquires a shot image of the actual object;

determining virtual object depth information of different portions of a virtual object based on a virtual distance of respective portions of the virtual object from a virtual imaging device at a location corresponding to the object imaging device;

acquiring pixels of a respective portion of the shot image, the acquired shot image pixels being a function of the actual distance to the corresponding portion of the actual object from the object imaging device;

acquiring pixels of a respective portion of an image of the virtual object, the acquired virtual object image pixels being a function of the virtual distance to the corresponding portion of the virtual object from the virtual imaging device;

determining an anteroposterior relationship between the actual object within flail the shot image obtained by the object imaging device and the virtual object for each of the portions of the actual object and the corresponding portions of the virtual object by comparing values of the actual distance of a respective portion of the actual object and the virtual object distance of the corresponding portion of the virtual object from their respective object imaging device and virtual imaging device; and displaying the pixels of the portions of the virtual object image pixels and not the shot image pixels of the corresponding portions of the shot image when the portions of the virtual object are determined to be located in front of the actual object or displaying the shot image pixels of the portions of the shot image and not the virtual object image pixels of the corresponding portions of the virtual image when the portions of the virtual object are determined to be located behind the actual object so that the objects are displayed in accordance with the determined anteroposterior relationship.

\* \* \* \* \*